United States Patent
Ippatapu

(10) Patent No.: US 11,513,841 B2
(45) Date of Patent: Nov. 29, 2022

(54) METHOD AND SYSTEM FOR SCHEDULING TASKS IN A COMPUTING SYSTEM

(71) Applicant: EMC IP Holding Company LLC, Hopkinton, MA (US)

(72) Inventor: Venkata L R Ippatapu, Westborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 408 days.

(21) Appl. No.: 16/516,298

(22) Filed: Jul. 19, 2019

(65) Prior Publication Data

US 2021/0019178 A1  Jan. 21, 2021

(51) Int. Cl.
*G06F 9/48* (2006.01)
*G06F 8/41* (2018.01)
*G06F 9/50* (2006.01)

(52) U.S. Cl.
CPC ........... *G06F 9/4881* (2013.01); *G06F 8/443* (2013.01); *G06F 9/5038* (2013.01)

(58) Field of Classification Search
CPC . G06F 8/71; G06F 8/77; G06F 9/4881; G06F 2209/484; G06F 2209/501; G06F 9/5038; G06F 9/5044; G06F 9/54; H04L 67/10
See application file for complete search history.

(56) References Cited

U.S. PATENT DOCUMENTS

| | | | | |
|---|---|---|---|---|
| 8,682,933 B2 * | 3/2014 | Stergiou | ............. | G06F 16/9024 707/798 |
| 10,037,198 B2 * | 7/2018 | Stanfill | .................. | G06F 8/456 |
| 10,496,413 B2 * | 12/2019 | Gaur | ..................... | G06F 9/3838 |
| 2009/0055813 A1 * | 2/2009 | Haber | ................... | G06F 8/4441 717/158 |
| 2013/0047137 A1 * | 2/2013 | Bak | .......................... | G06F 8/71 717/121 |
| 2013/0268565 A1 * | 10/2013 | Stergiou | ............. | G06F 16/9024 707/E17.011 |
| 2014/0101643 A1 * | 4/2014 | Inoue | ..................... | G06F 8/443 717/156 |
| 2014/0130056 A1 * | 5/2014 | Goodman | ............ | G06F 9/4881 718/104 |
| 2015/0046684 A1 * | 2/2015 | Mehrara | ................ | G06F 8/433 712/220 |
| 2015/0082314 A1 * | 3/2015 | Suzuki | ...................... | G06F 9/54 718/102 |
| 2017/0046138 A1 * | 2/2017 | Stanfill | .................... | G06F 8/40 |
| 2018/0136918 A1 * | 5/2018 | Chen | .................... | G06F 8/4442 |
| 2018/0232235 A1 * | 8/2018 | Gaur | .................... | G06F 9/3838 |

OTHER PUBLICATIONS

McDowell, Gayle Laakmann; "Cracking the Coding Interview", 6th Edition, 2008 (11 pages).

* cited by examiner

Primary Examiner — Lewis A Bullock, Jr.
Assistant Examiner — Melissa A Headly
(74) Attorney, Agent, or Firm — Chamberlain, Hrdlicka, White, Williams & Aughtry

(57) ABSTRACT

In general, embodiments of the invention relate to a method and computing system for scheduling tasks (functions or routines) dynamically from Input/Output (I/O) operations that may be received from a client. The scheduling or ordering of the tasks play an important role in the overall latency of the execution of IO operations, as each task may consume significant amount of computing resources.

11 Claims, 6 Drawing Sheets

METHOD AND SYSTEM FOR SCHEDULING TASKS IN A COMPUTING SYSTEM

BACKGROUND

Computing devices may include any number of internal components such as processors, memory, and persistent storage. Each of the internal components of a computing device may utilize computing recourses. The manner in which computing resources are utilized may impact the overall performance of the computing resources.

SUMMARY

In general, in one aspect, the invention relates to a method for scheduling tasks, the method includes receiving, by a computing system, an Input/Output (I/O) operation from a client, identifying tasks associated with the I/O operation, ordering the tasks based on task dependencies to obtain task order, selecting a highest order task based on the task order, executing the highest ordered task; and updating, based on an execution of the highest order task, a first set of edge weights for remaining tasks in ordered tasks to obtain an updated task order.

In general, in one aspect, the invention relates to the non-transitory computer readable medium (CRM) storing instructions for scheduling tasks, the instructions comprising functionality for: receiving, by a computing system, an Input/Output (I/O) operation from a client, identifying tasks associated with the I/O operation; ordering the tasks based on task dependencies to obtain task order, selecting a highest order task based on the task order, executing the highest ordered task, and updating, based on an execution of the highest order task, a first set of edge weights for remaining tasks in ordered tasks to obtain an updated task order.

In general, in one aspect, the invention relates to a computing system, comprising a processor, a scheduler, and wherein the scheduler when, executed by the processor enables the scheduler to perform a method, the method comprising: receiving, by the computing system, an Input/Output (I/O) operation from a client, identifying tasks associated with the I/O operation, ordering the tasks based on task dependencies to obtain task order, selecting a highest order task based on the task order, executing the highest ordered task, and updating, based on an execution of the highest order task, a first set of edge weights for remaining tasks in ordered tasks to obtain an updated task order.

DETAILED DESCRIPTION

Figure 1:
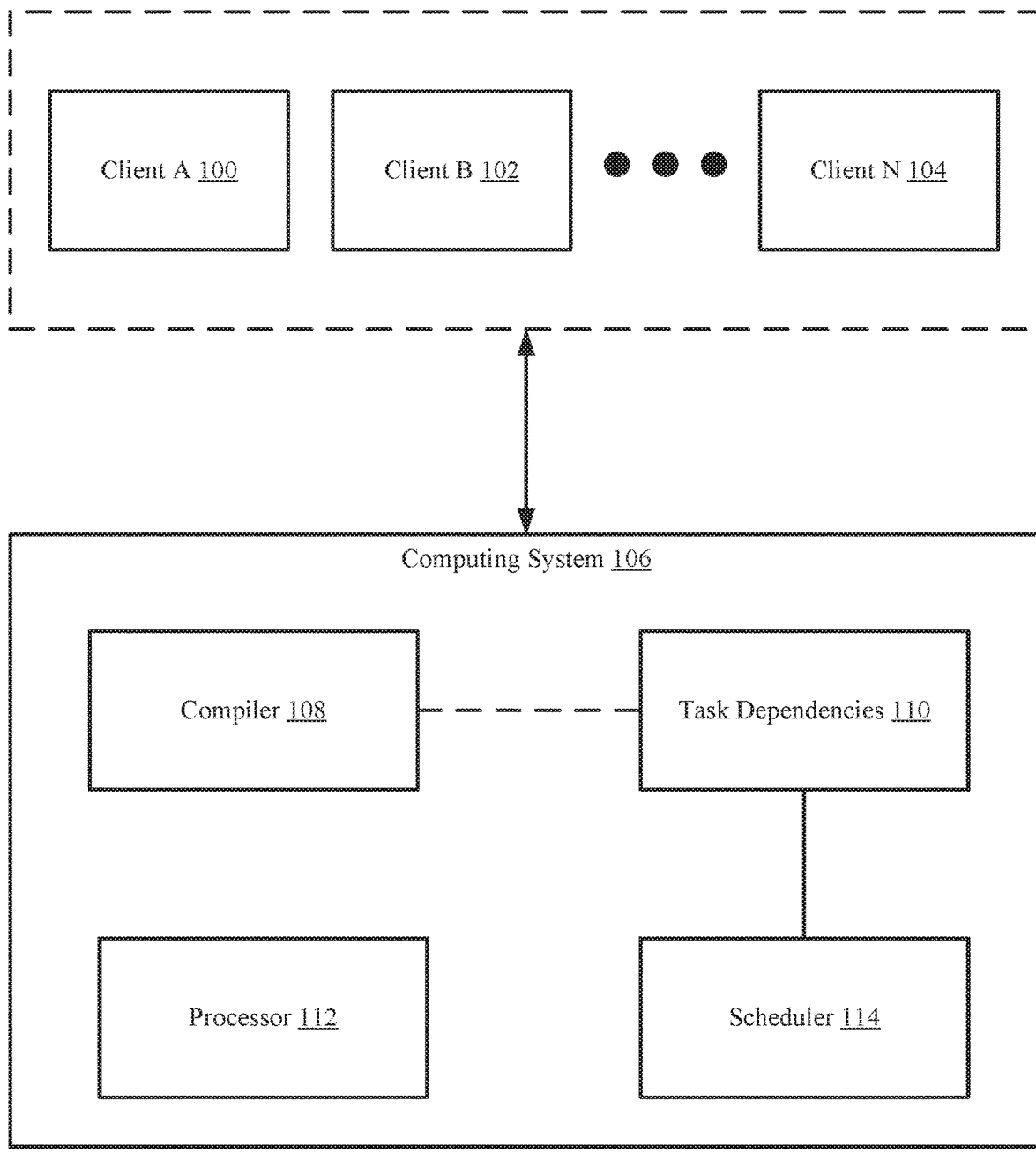
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4F, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and computing system for scheduling tasks (functions or routines) dynamically from Input/Output (I/O) operations that may be received from a client. The scheduling or ordering of the tasks play an important role in the overall latency of the execution of IO operations, as each task may consume significant amount of computing resources. In order to prevent (or decrease) latency in the processing of tasks related to IO operations, the invention takes into account the complete behavior of the application and their tasks to optimally order the tasks during IO operation. More specifically, embodiments of the invention relate to identifying, during compile time, tasks in an application being compiled. Once the tasks are identified, the dependencies between the various tasks are identified and a directed graph is generated. Edge weights may be assigned to the directed graph and dynamically updated during execution of the tasks.

In one or more embodiments of the invention, the dependency information may then be used during runtime to improve the processing of I/O operations (i.e., tasks that are performed by the application in response to receiving I/O operations from the clients).

FIG. 1 shows a system in accordance with one or more embodiments of the invention. The system includes one or more clients (100, 102, 104) operatively connected at least one computing system (106). The aforementioned components may communicate using any combination of wired and/or wireless connections and wired and/or wireless networks. Each of the aforementioned components is described below.

In one or more embodiments of the invention, the clients (100, 102, 104) are devices, operated by users that interact with at least one computing system. More specifically, the clients may transmit I/O operations to the computing system. These I/O operations may subsequently processed by the computing system (or more specifically, an application (s) executing thereon). Examples of I/O operations may include, but are not limited to, a write request from the client to store data on the computing system and a read request from the client to read data from the computing system.

In one or more embodiments of the invention, the clients (100, 102, 104) are implemented as computing devices. A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a client described throughout this application.

In one or more embodiments of the invention, the clients (100, 102, 104) can be implemented as a logical device. The logical device may utilize the computing resources of any number of computing devices and thereby provide the functionality of the clients (100, 102, 104) described throughout this application.

In one or more embodiments of the invention, the computing system (106) includes a compiler (108), task dependencies (110), and a scheduler (114). The compiler (108) and the scheduler (114) may execute on the processor (112). Though not shown in FIG. 1, the computing system may also have one or more multiple applications executing on the processor. Each of these components is described below.

In one or more embodiments of the invention, the compiler (108) is an executable program that includes functionality to translate a computer program in a first language (or format) into a different language (or format). For example, the compiler may convert source code for an application into object code that may be executed by the processor. As part of the compilation process and in accordance with one or more embodiments of the invention, the compiler identifies tasks in the application and the relationship between tasks and I/O operations (i.e., I/O operations that are issued by the client (see e.g., FIG. 4). The compiler (108), after identifying the task, identifies task dependencies associated with the tasks. In this context, a first task may be deemed to be dependent on (or be a child task of) a second task if the second task must be performed prior to the first task being performed. The compiler (108) creates one or more directed graphs that encode the task dependencies (110). Each node in a given directed graph represents a task and the edges between the nodes represent task dependencies. Accordingly, a node within a directed graph may have a root node (i.e., a node representing a task that does not depend on any other task or a task that must be executed at all times processing IO operations) or a dependent node, which may depend on zero, one or more root nodes and/or zero, one or more dependent nodes. A non-zero edge weight between any two nodes represents the amount of outstanding work to be executed by the dependent node. The compiler (108) may assign edge weights to zero, one or more edges, the edge weights assigned by the compiler may be default edge weights that may be specified by compiler, by a user that initiated the compilation of the application, and specified by another entity. In one embodiment of the invention, the edge weights assigned by the compiler may be the same for all edges; alternatively, the edges weights assigned by the compiler may vary across the different edges in the directed graph.

In one embodiment of the invention, the scheduler (114) is a computer program that (i) identifies tasks associated with an I/O operation, (ii) orders the identified tasks based on task dependencies (110); (iii) obtains and/or generates updated edge weights as the various tasks are executed during; and (iv) updates the ordering the ordering of the unprocessed tasks based on (iii). Additional detail about the aforementioned scheduler is described in FIG. 3.

In one or more embodiments of the invention, the computing system (106) can be implemented as a logical device. The logical device may utilize the computing resources of any number of computing devices and thereby provide the functionality of the computing system (106) described throughout this application.

While FIG. 1 shows a system in accordance with one or more embodiments of the invention, the invention may be implemented on systems with different architectures and/or components without departing from the invention.

Figure 2:
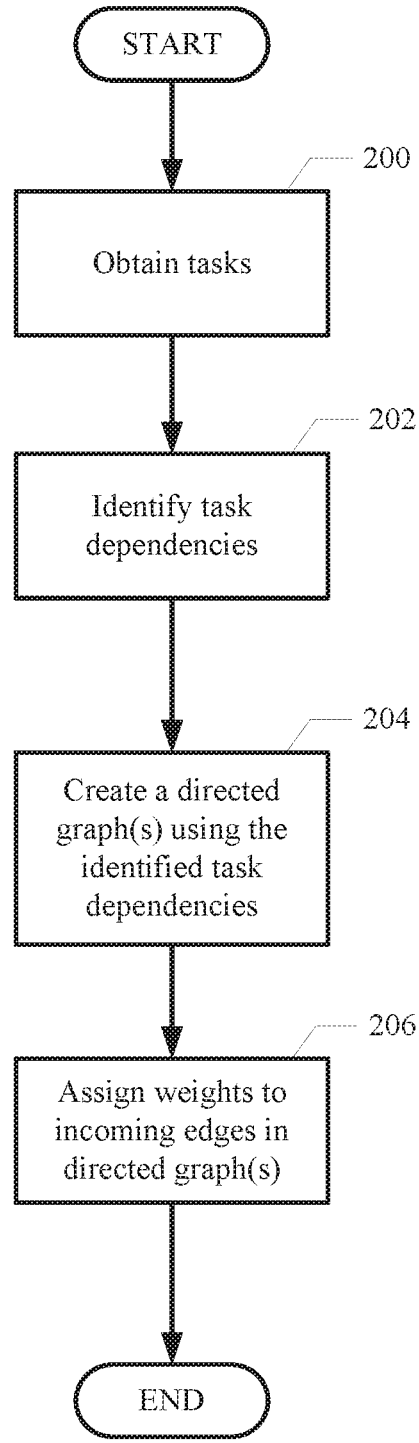
FIG. 2 shows a method in accordance with one or more embodiments of the invention.
Figure 3:
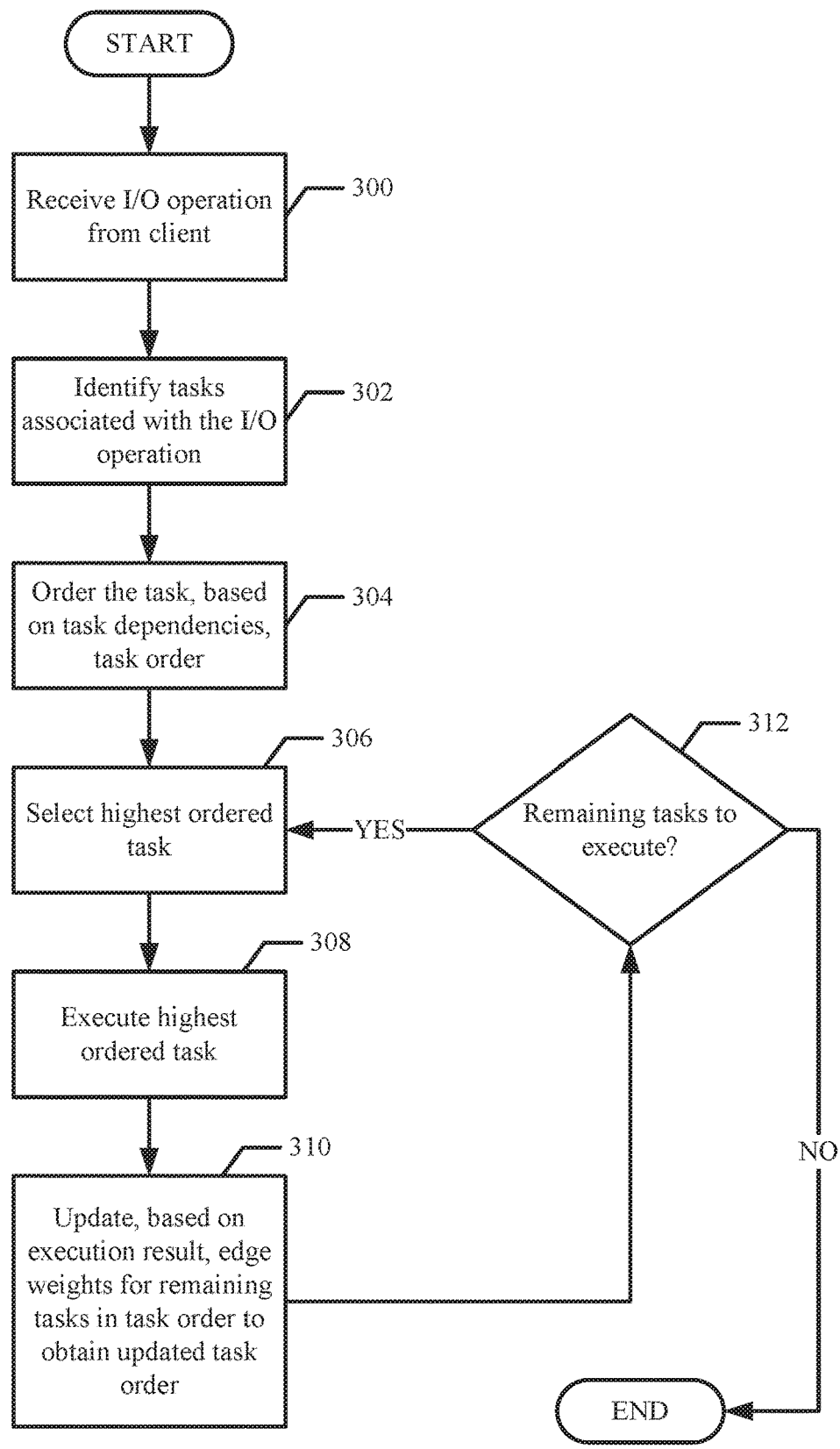
FIG. 3 shows a method in accordance with one or more embodiments of the invention.

FIGS. 2-3 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-3 may be performed in parallel with any other steps shown in FIGS. 2-3 without departing from the scope of the invention.

FIG. 2 shows a method for identifying tasks and tasks dependencies to generate a directed graph in accordance with one or more embodiments of the invention The method shown in FIG. 2 may be performed, for example, by a compiler during compile time.

Turning to FIG. 2, in step 200, application tasks (also referred to as tasks) are obtained by the compiler. The tasks are associated with I/O operations of an application, which may executed by a computing system. The I/O operations may include every task associated with application being compiled.

In step 202, the task dependencies are identified by the compiler. The task dependencies include the tasks and the child tasks associated with each task (e.g., FIG. 1, 110). The compiler may include functionality to analyze the source code of the application during compile time to identify the task dependencies. Any known or later discovered method for analyzing the source code may be used to determine the task dependencies.

In step 204, one or more directed graphs are created using the identified task dependencies.

In step 206, edge weights are assigned to edges in the directed graph based. The edge weights assigned in step 206 are assigned by the compiler and may be initial or default edge weights. The direct graphs (with the edge weights), once generated, are stored in memory and/or persistent storage of the computing system. The directed graphs may be stored in any location that is accessible to the scheduler during runtime.

FIG. 3 shows a method for ordering and executing tasks in accordance with one or more embodiments of the invention. The method shown in FIG. 3 may be performed, for example, by a scheduler during runtime.

Turning to FIG. 3, in step 300, an I/O operation issued by the client is received by the scheduler.

In step 302, the tasks associated with I/O operation are identified by the scheduler. In one embodiment of the invention, the scheduler accesses a data structure that includes a mapping between I/O operations and tasks associated with the I/O operation.

In step 304, the tasks identified in step 302 are ordered based on task dependencies to obtain a task order. In one or more embodiments of the invention, the scheduler performs a breadth first traversal or a depth-first traversal starting at the root node or highest ordered task node in the directed graph corresponding to the selected task. The result of the traversal is an ordered subset set of tasks. The aforementioned process is repeated until all tasks identified in step 302 have been processed as part of the traversal. In one embodiment of the invention, if the directed graphs associated with the identified tasks include edge weights, then only nodes that are connected by edges that have non-zero weights are traversed as part of the aforementioned traversal. In this manner, only nodes corresponding to tasks that require processing are included in the task order, which limits redundant function calls associated with the IO operation. Said another way, if a node has an incoming edge that has a zero weigh, then this node (and any node depending therefrom) do not need to be processed and, as such, are not part of the task order. Further, if two nodes are at the same level in directed graph, the incoming edge weights are used to order the tasks associated with these nodes.

In one embodiment of the invention, if the tasks are associated with multiple directed graphs, then the traversal described above is performed across all directed graphs. In such scenarios, the traversal of the individual directed graphs may result in multiple ordered subsets of tasks, which may then be merged to generate the task order. The merger of the subsets of tasks may include prioritizing tasks associated with root nodes prior to ordering of all other dependent tasks. Further, the ordering of the various dependent tasks may be based, e.g., on the incoming edge weights of nodes corresponding to the dependent tasks. Other methods for merging the subsets of ordered tasks without departing from the invention.

In step 306, the scheduler selects the highest ordered task based on the task order. The highest ordered task is the first ordered (or highest priority) task in the task order. The highest order task does not depend on the execution of any other task in the current task order. For example, consider a scenario in which task A is dependent on task B, and task C and task D are dependent on task A. Accordingly, the task order is B, A, D, and C. Task B is the highest ordered task, because task B is not dependent on another task.

In step 308, the highest ordered task is executed by the scheduler. In the example above in step 306, task B was determined to be the highest ordered task. Therefore, task B may be executed by the scheduler.

In step 310, the edge weights for the remaining tasks in the task order are updated dynamically based on the execution result to obtain an updated task order. For example, continuing from the examples in steps 306 and 308, task C and task D are dependent on task A. The edge weight for task A to task C may be assigned 2 initially but is later dynamically updated to 1. Also, the edge weight for task A to task D may be assigned 1 initially but is later updated to 0. The result of the updated edge weights is that task D no longer needs to be executed. Accordingly, the updated task order is A, C.

In step 312, a determination is made as to whether there are any remaining tasks to execute. If there are remaining tasks to execute, the process proceeds to step 306, where the next task to be executed is determined using the updated task order determined in step 310. However, if there are no remaining tasks to process, the process ends.

EXAMPLE

The following section describes an example. The example, illustrated in FIGS. 4A-4F, is not intended to limit the invention.

FIGS. 4A-4F show an example for identifying task, determining task dependencies, and ordering the tasks to be executed based on a task order.

Figure 4A:
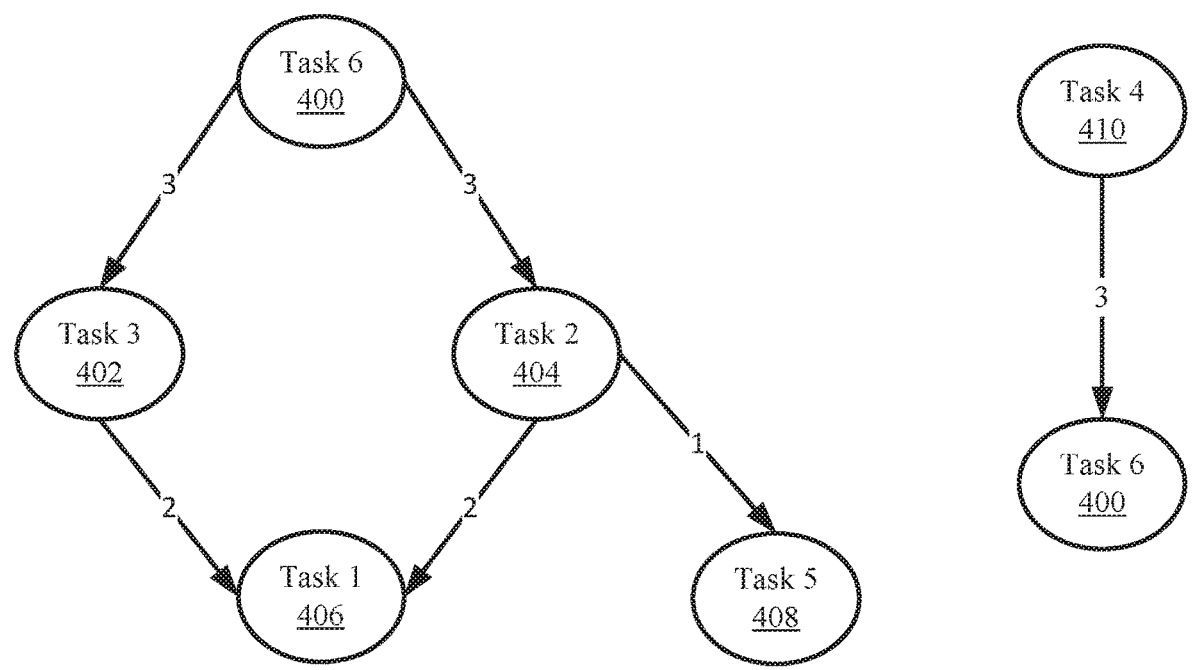
FIGS. 4A-4F show an example in accordance with one or more embodiments of the invention.

Referring to FIG. 4A, during compile time, a compiler obtains tasks and identifies the task dependencies associated with the tasks. The tasks are task 1 (406), task 2 (404), task 3 (402), task 4 (410), task 5 (408), and task 6 (406). The following task dependencies are identified by the compiler: (4, 6), (6, 3), (6, 2), (3, 1), (2, 1) and (2, 5). Based on the identified tasks dependencies a directed graph is created. Default edge weights are assigned to the incoming edges in the directed graph as follows: task 4 (410) to task 6 (400) has a weight of 3; task 6 (400) to task 3 (402) has a weight of 3; task 6 (400) to task 2 (404) has a weight of 3; task 3 (402) to task 1 (406) has a weight of 2; task 2 (404) to task 1 (406) has a weight of 2; and task 2 (404) to task 5 (408) has a weight of 1. These edge weights are arbitrary and may be referred to as default edge weights.

Figure 4B:
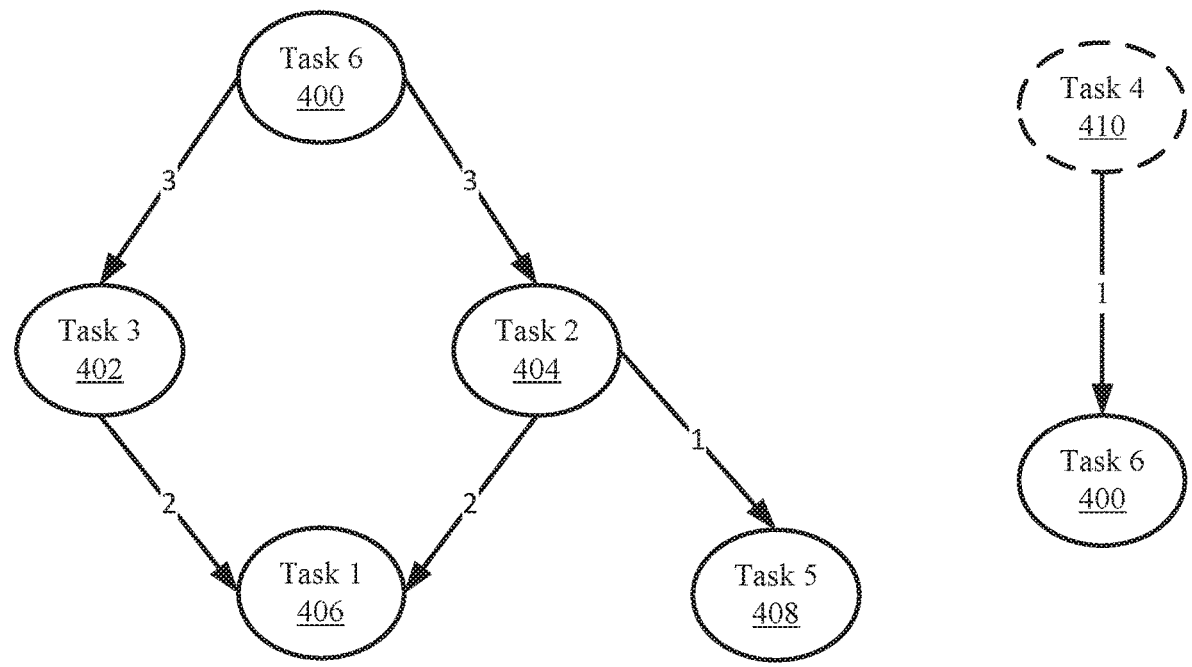

Referring to FIG. 4B, consider a scenario in which an I/O operation is received by the computing system from a client. There scheduler, at run time, determines that tasks 1-6 are associated with the I/O operation and obtains the directed graphs (i.e., task dependencies) (see e.g. FIG. 4A) generated during compile time. The scheduler subsequently performs one or more depth-first searches on the directed graphs to obtain the task order. Based on the task dependencies the task order is as follows: task 4 (410), task 6 (400), task 3 (402), task 2 (404), task 1 (406), and task 5 (408). Based on the task order, task 4 is the highest ordered task. Also, tasks 1 and task 5 are terminating tasks and are executed last in the task order. In this context, a terminating task is a task from which no other tasks depend. Continuing with the example, task 4 is executed. Based on the execution of task 4 (410), the edge weight from task 4 (410) to task 6 (400) is dynamically updated depending on whether there is more work to be performed by task 6 (400) after the execution of task 4 (410). If there is a work to be performed by task 6 (400), the edge weight between task 4 (410) and task 6 (400) is updated to a value 1; otherwise the edge weight is 0. If the edge weight is 0, it means that there is no pending work to be completed by task 6 (400) and application can optimize the performance by not scheduling task 6 (400) and any tasks, which depend from task 6 (400), which eliminates a redundant function call to task 6 (400) and its dependent tasks. In this example, the edge weight from task 4 (410) to task 6 (400) is dynamically updated to 1.

Figure 4C:
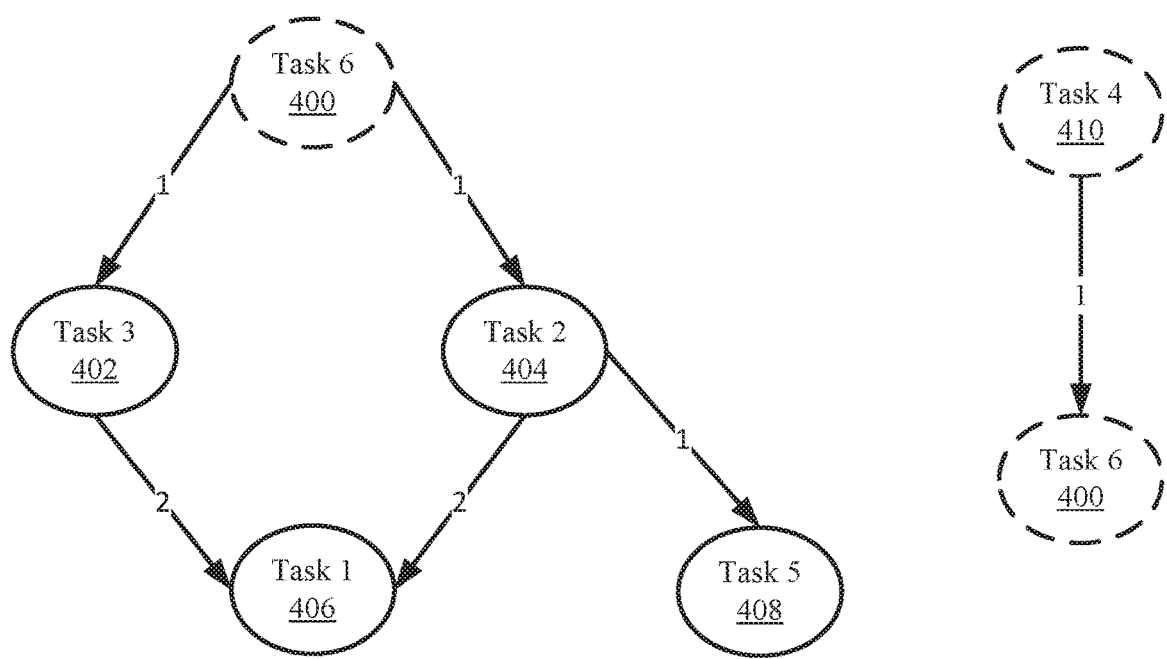

Referring to FIG. 4C, because there is a non-negative edge weight between task 4 and task 6, the updated task order is as follows: task 6 (400), task 3 (402), task 2 (404), task 1 (406), and task 5 (408). Accordingly, task 6 (400) is now the highest ordered task and is executed. Based on the execution of task 6 (400), the edge weight from task 6 (400) to task 3 (402) and task 6 (400) to task 2 (404) is updated to 1.

Figure 4D:
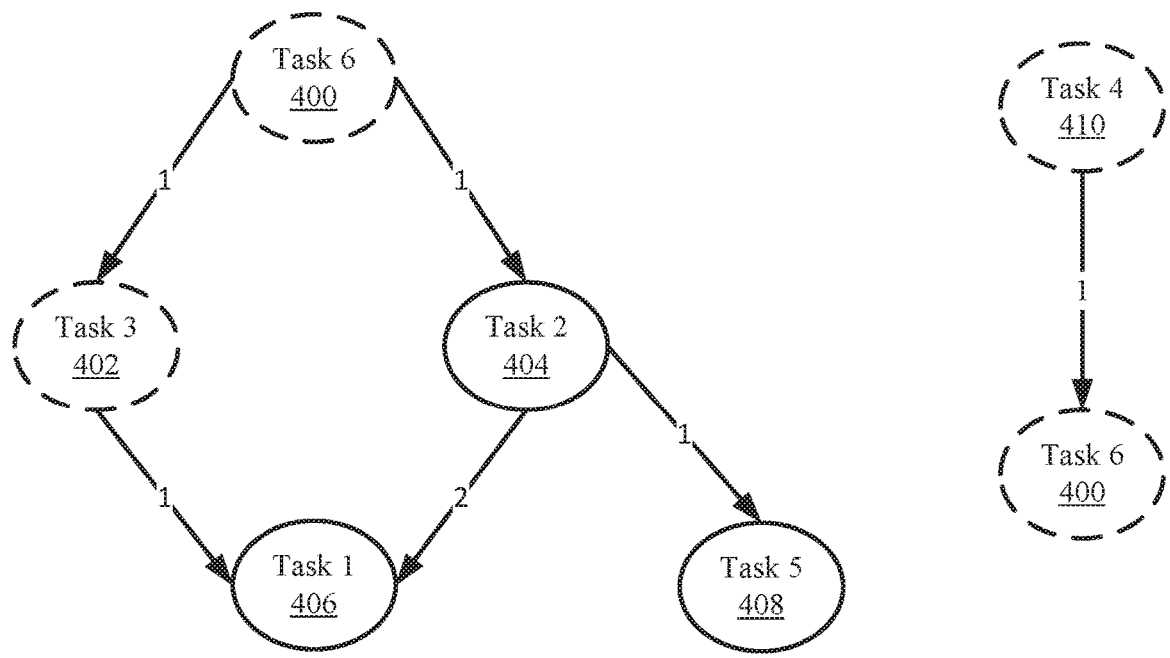

Referring to FIG. 4D, because there is a non-negative edge weight between task 6 (400) and task 3 (402) Task 3 (402) is now the highest ordered task and, as such, is executed. Based on the execution of task 3 (402), the following edge weights are updated: task 3 (402) to task 1 (406).

Figure 4E:
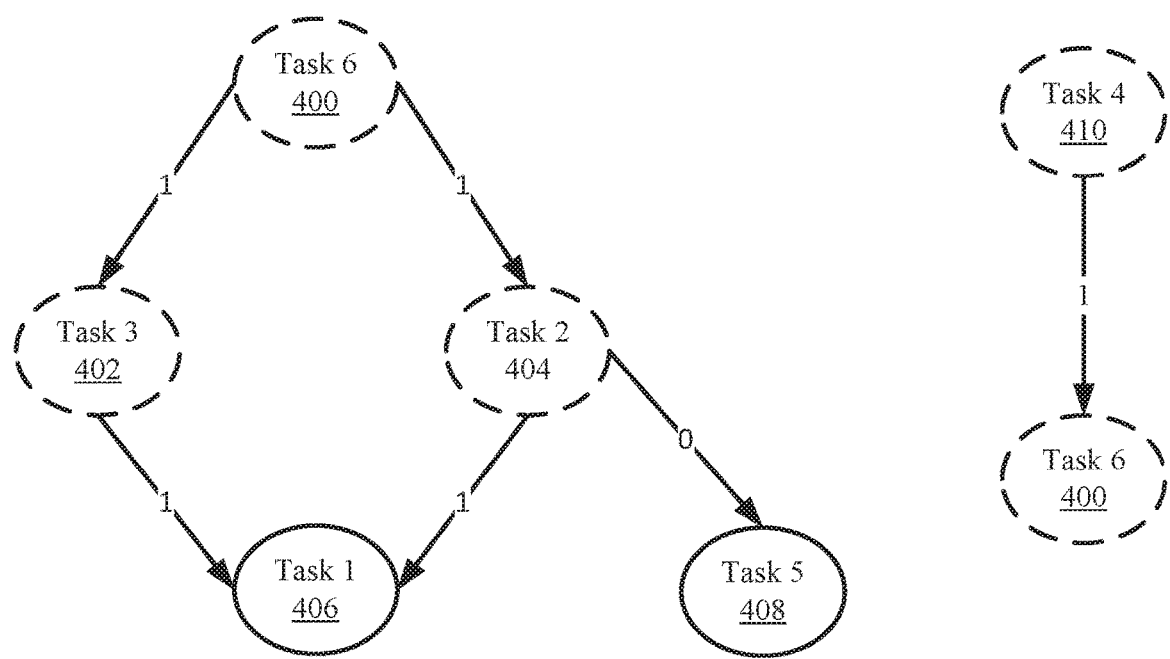

Referring to FIG. 4E, because there is a non-negative edge weight between task 6 and task 2 (404) Task 2 (404) is the highest ordered task and is executed. Based on the execution of task 2 (404), the following edge weights are updated: task 2 (402) to task 1 (406) to 1 and task 2 (404) to task 5 (408) to 0.

Figure 4F:
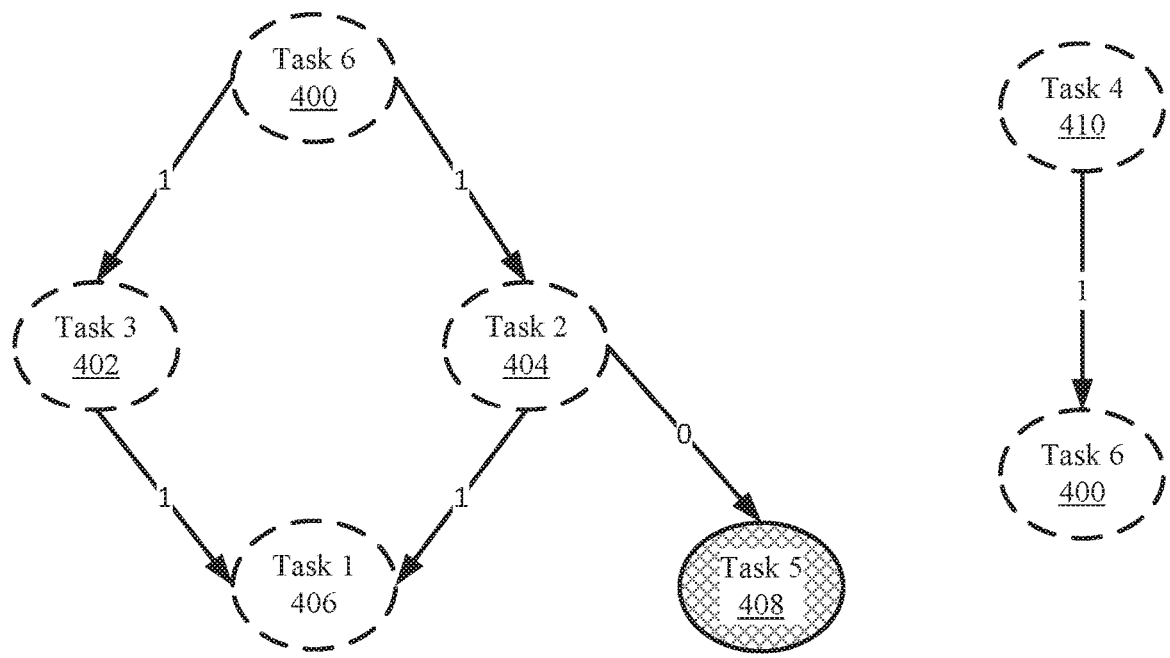

Referring to FIG. 4F, task 1 (406) and task 5 (408) are the last tasks to execute, because task 1 and task 5 are terminating tasks. Based on the task dependencies and the edge weights, the task order is as follows: task 1 (406) and task 5 (408). If incoming edge weight is non negative, then Task 1 (404) and task 5 (408) are executed. However, the incoming coming edge weight as it relates to task 5 (408) is 0. Therefore task 5 (408) is not executed.

END OF EXAMPLE

One or more embodiments of the invention may be implemented using instructions executed by one or more processors of the computing system. Further, such instructions may correspond to computer readable instructions that are stored on one or more non-transitory computer readable mediums.

One or more embodiments of the invention may improve the operation of one or more computing systems. More specifically, embodiments of the invention (1) compute the most optimized order of threads tasks taking complete system behavior and functionality of every task into account; (2) generate a directed graph without during compile time such that there is minimal impact to process tasks during runtime; and (3) generate the most optimal scheduling order to minimize the computing resource usage. With respect to (3), by scheduling the tasks based on task dependencies as opposed to arbitrarily scheduling tasks, any given task that is executed based on the task order should be able to be completely performed as it does not have to wait for any other tasks to be execute before it can be executed.

While the embodiments have been described with respect to a limited number of embodiments, those skilled in the art, having benefit of this disclosure, will appreciate that other embodiments can be devised which do not depart from the scope of the embodiments as disclosed herein. Accordingly, the scope of the embodiments should be limited only by the attached claims.

What is claimed is:

1. A method for scheduling tasks, the method comprising:
    receiving, by a computing system, an Input/Output (I/O) operation from a client;
    identifying a plurality of tasks associated with the I/O operation;
    identifying dependencies for each of the plurality of tasks;
    creating a directed graph of the tasks using the identified dependencies;
    assigning a first set of edge weights to each task of the plurality of tasks based on the identified dependencies, wherein at least one edge weight of the first set of edge weights is non-zero;
    ordering the tasks based on the first set of edge weights to obtain a task order;
    selecting a highest order task based on the task order, wherein the highest ordered task does not have a zero-edge weight;
    executing the highest ordered task;
    updating, dynamically, based on an execution of the highest order task, the first set of edge weights for remaining tasks to obtain an updated task order;
    selecting a highest order task from the updated task order;
    executing the highest ordered task from the updated task order, wherein tasks with a zero-edge weight are not executed; and
    updating, dynamically, based on an execution of the highest order task from the updated task order, a second set of edge weights for remaining tasks in updated task order to obtain a second updated task order, wherein at least one of the first set of edge weights is modified after the execution of the highest ordered task, and wherein the task dependencies are generated by a compiler during compile-time.

2. The method of claim 1,
    wherein the task dependencies are specified using a directed graph comprising a plurality of edges; and
    wherein each of a first set of edges in the directed graph is associated with one of the first set of edge weights.

3. The method of claim 1, wherein each at least portion of the task dependencies are specified using a directed graph.

4. The method of claim 3, wherein the task order is determined using a depth-first search, performed on the directed graph.

5. A non-transitory computer readable medium (CRM) storing instructions for scheduling tasks, the instructions comprising functionality for:
    receiving, by a computing system, an Input/Output (I/O) operation from a client;
    identifying a plurality of tasks associated with the I/O operation;
    identifying dependencies for each of the plurality of tasks;
    creating a directed graph of the tasks using the identified dependencies;
    assigning a first set of edge weights to each task of the plurality of tasks based on the identified task dependencies, wherein at least one edge weight of the first set of edge weights is non-zero;
    ordering the tasks based on the first set of edge weights to obtain a task order;
    selecting a highest order task based on the task order, wherein the highest ordered task does not have a zero-edge weight;
    executing the highest ordered task;
    updating, dynamically, based on an execution of the highest order task, the first set of edge weights for remaining tasks to obtain an updated task order;
    selecting a highest order task from the updated task order;
    executing the highest ordered task from the updated task order, wherein tasks with a zero-edge weight are not executed; and
    updating, dynamically, based on an execution of the highest order task from the updated task order, a second set of edge weights for remaining tasks in updated task order to obtain a second updated task order, wherein at least one of the first set of edge weights is modified after the execution of the highest ordered task, and wherein the task dependencies are generated by a compiler during compile-time.

6. The CRM of claim 5, wherein the task dependencies are specified using a directed graph comprising a plurality of edges; and wherein each of a first set of edges in the directed graph is associated with one of the first set of edge weights.

7. The CRM of claim 5, wherein each of the task dependencies are specified using a directed graph.

8. The CRM of claim 7, wherein the task order is determined using a depth-first search, performed on the directed graph.

9. A computing system, comprising:
a processor;
a scheduler; and
wherein the scheduler, when executed by the processor, enables the scheduler to perform a method, the method comprising:
receiving, by a computing system, an Input/Output (I/O) operation from a client;
identifying a plurality of tasks associated with the I/O operation;
identifying dependencies for each of the plurality of tasks;
creating a directed graph of the tasks using the identified dependencies;
assigning a first set of edge weights to each task of the plurality of tasks based on the identified task dependencies, wherein at least one edge weight of the first set of edge weights is non-zero;
ordering the tasks based on the first set of edge weights to obtain a task order;
selecting a highest order task based on the task order, wherein the highest ordered task does not have a zero-edge weight;
executing the highest ordered task;
updating, dynamically, based on an execution of the highest order task, the first set of edge weights for remaining tasks to obtain an updated task order;
selecting a highest order task from the updated task order;
executing the highest ordered task from the updated task order, wherein tasks with a zero-edge weight are not executed; and
updating, dynamically, based on an execution of the highest order task from the updated task order, a second set of edge weights for remaining tasks in updated task order to obtain a second updated task order,
wherein at least one of the first set of edge weights is modified after the execution of the highest ordered task, and
wherein the task dependencies are generated by a compiler during compile-time.

10. The computing system of claim 9,
wherein the task dependencies are specified using a directed graph comprising a plurality of edges; and
wherein each of a first set of edges in the directed graph is associated with one of the first set of edge weights.

11. The computing system of claim 9, wherein each of the task dependencies are specified using a directed graph.

* * * * *